United States Patent [19]

F'Geppert

[11] 4,040,647

[45] Aug. 9, 1977

[54] MANUAL CONTROLLER FOR VEHICLE LEVEL ADJUSTMENT

[75] Inventor: Erwin F'Geppert, Novi, Mich.

[73] Assignee: The United States of America as represented by the Secretary of the Army, Washington, D.C.

[21] Appl. No.: 668,351

[22] Filed: Mar. 19, 1976

[51] Int. Cl.² .............................................. B60S 9/14
[52] U.S. Cl. .................................. 280/766; 200/6 A; 200/308; 280/6.1; 254/45
[58] Field of Search ...................... 280/6 R, 6.1, 6.11; 254/45, 89 R, 89 M; 200/6 A, 50 C, 5 R, 5 B, 5 C, 5 D, 153 T, 308; 74/471

[56] References Cited

U.S. PATENT DOCUMENTS

| 2,808,476 | 10/1957 | Elliott | 200/6 A |
| 2,851,674 | 9/1958 | Boone | 200/6 A |
| 3,523,698 | 8/1970 | Bishop | 254/86 R |
| 3,835,270 | 9/1974 | Dufresne | 200/6 A |

*Primary Examiner*—Philip Goodman
*Attorney, Agent, or Firm*—Peter A. Taucher; John E. McRae; Nathan Edelberg

[57] ABSTRACT

A manual controller for tripping or actuating switches used to energize jack motors associated with a vehicle-raising or lowering mechanism, e.g a missile launch trailer or mobile home. The controller uses the "joy stick" principle, wherein the human operator moves an upstanding control rod or stick in any one of four directions to actuate selected ones of the switches. In fact the controller comprises two independently-movable joy sticks; one joy stick controls the "vehicle-raise" action, and the other joy stick controls the "vehicle-lower" action.

5 Claims, 6 Drawing Figures

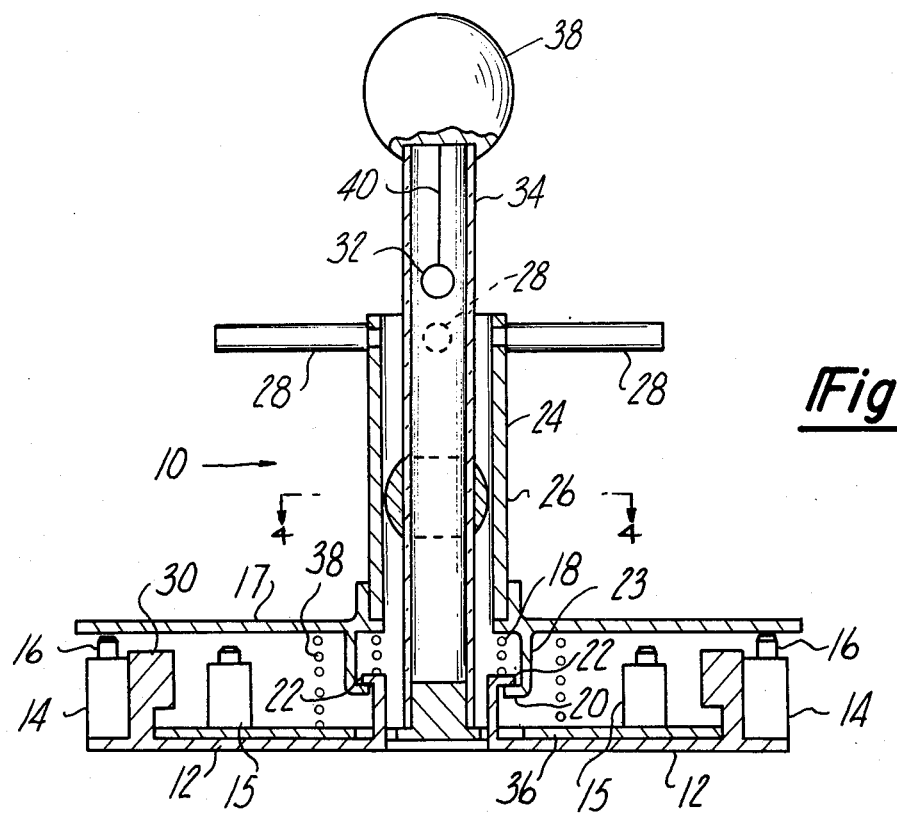
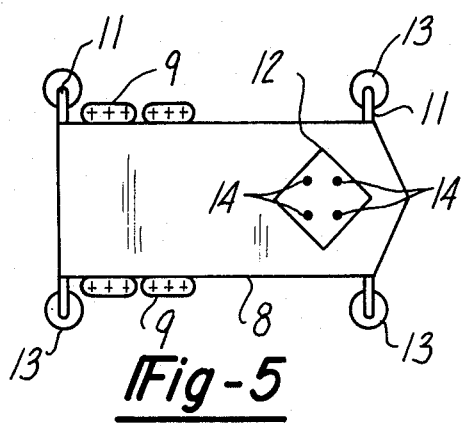
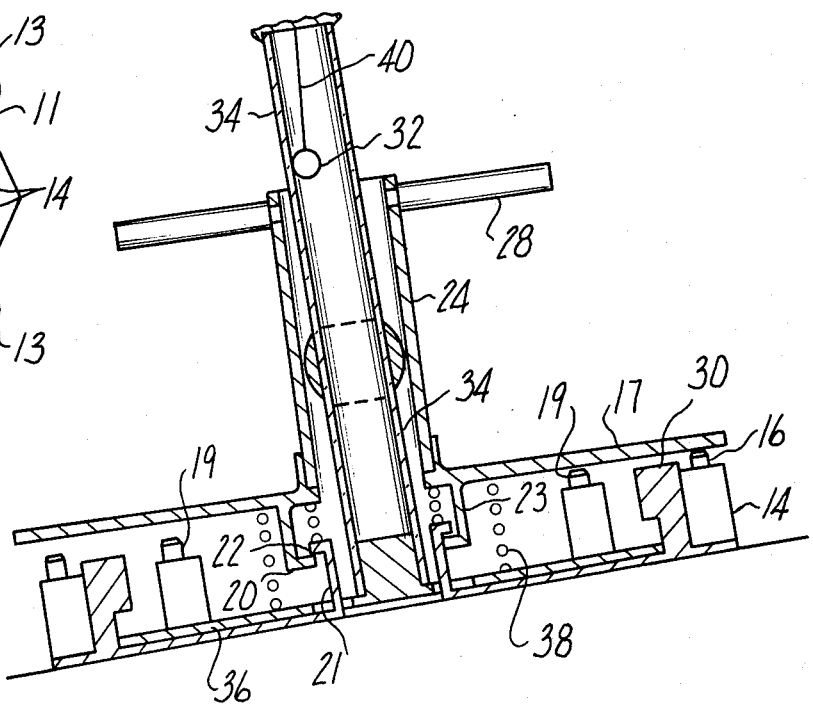

MANUAL CONTROLLER FOR VEHICLE LEVEL ADJUSTMENT

BACKGROUND AND SUMMARY OF THE INVENTION

A presently-existing missile launch trailer is equipped with four outriggers or jacks powered by electric motors for raising the trailer off its road wheels. The outrigger jacks include ground-engagement pads or disks that apply downward pressure on the ground, to thereby lift the trailer bed away from the ground surface. Preferably the lift-away action is continued until the road wheels substantially clear the ground surface; this transfers the trailer weight onto the pads and thereby reduces any tendency of the trailer to roll from its designated position. When the trailer is to be moved to a new site the jacks are actuated to lower the trailer to a condition in which it is supported by its road wheels (and a towing tractor attached thereto by a "fifth wheel" connection).

Each of the four outrigger jacks must be energized for two-directional movement, either up or down, in accordance with the desires of the human operator. Each jack (or group of jacks) must be capable of energization independently of the other jacks so that the vehicle (trailer) can assume a substantially level attitude irrespective of different terrain slopes and contours. The "level attitude" requirement poses a "human indecision" problem during the trailer set-up period; the human operator is sometimes apt to make an incorrect switch selection that requires subsequent corrective action on his part. Such action could unduly delay total elapsed time to achieve trailer "lift-off" and attainment of a substantially level attitude. In some situations a long elapsed time could be detrimental to missile launch performance.

The present invention provides a manual controller which incorporates separate joy sticks for up and down movements. Each joy stick is restricted to tilting or rocking motions in four distinct directions for actuating selected ones of the jack-control switches. A pendulum-type "level" indicator is associated with the joy sticks to help the human operator select the "correct" direction of joy stick movement. In general, the invention seeks a controller structure that will minimize the "human indecision" problem.

IN THE DRAWINGS

FIGS. 1, 2 and 3 are semi-schematic views of a controller mechanism embodying the invention, taken at three different operating conditions.

FIGS. 5 and 6 are diagrammatic representations of trailers using the invention.

FIGS. 5 AND 6

Figure 3:
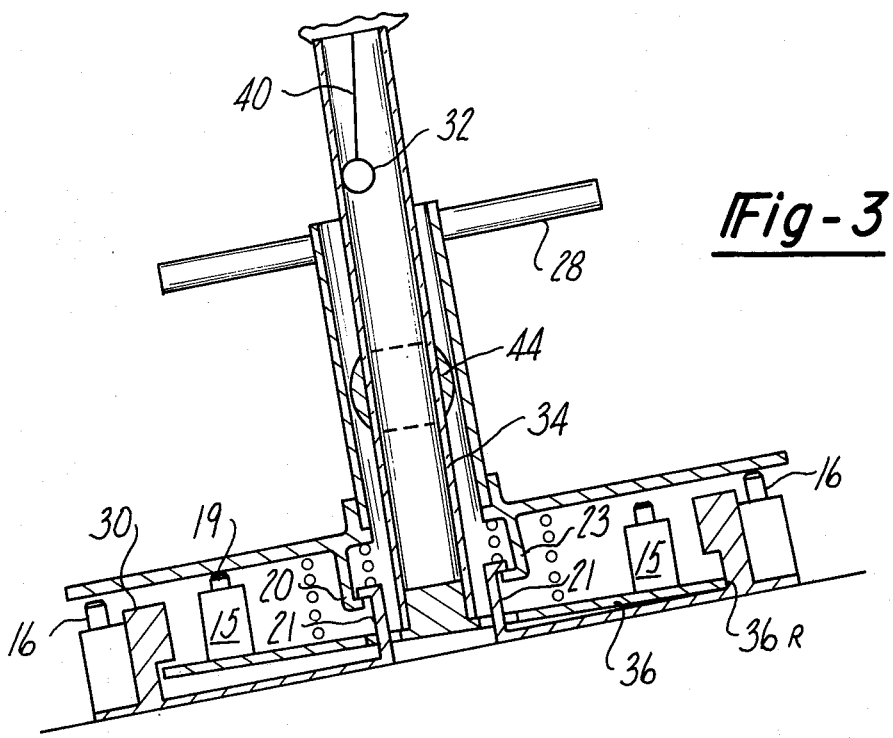

FIG. 5 looks down on a schematically illustrated trailer 8 having road wheels 9 at its rear end; the towing tractor is not shown. Each corner of the trailer is equipped with a jack or outrigger mechanism 11 having a ground-engagement pad 13. An electric motor in each outrigger operates a ball screw, scissors means, etc to apply a downward force on the associated pad 13, thereby raising the trailer and eventually the road wheels; the entire trailer weight is thereby borne by the four pads 13, which stabilize the trailer against shifting movement.

If the trailer happens to be located on uneven or sloping terrain the jacks must be selectively actuated in order to achieve a near-level trailer attitude. FIG. 5 schematically illustrates four switches 14 mounted on a base structure 12 carried by the trailer; these switches are generally oriented in a pattern that is a miniature replica of the orientation pattern of the four outriggers 11. The switches are connected through relays to the respective outrigger motors so that the human operator is able to select a switch and produce a "vehicle-raise" action at one corner of the vehicle. Other switches of a duplicate orientation pattern are provided to produce a localized "corner-lowering" action.

Figure 6:
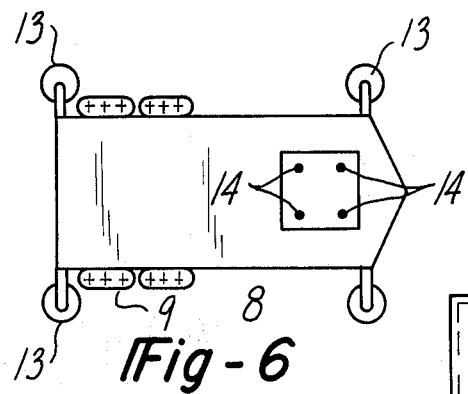

FIG. 6 illustrates an alternte arrangement wherein the four switches 14 are actuated in pairs to produce vehicle-raise actions at the vehicle sides, i.e. simultaneously at two corners. For example, the two front switches may be actuated together to raise the front end of the trailer, or the two switches on the right side of the vehicle may be actuated together to raise the right side of the vehicle.

Subsequent description will deal largely with the switch orientation shown in FIG. 5.

FIGS. 1 AND 4

Figure 4:
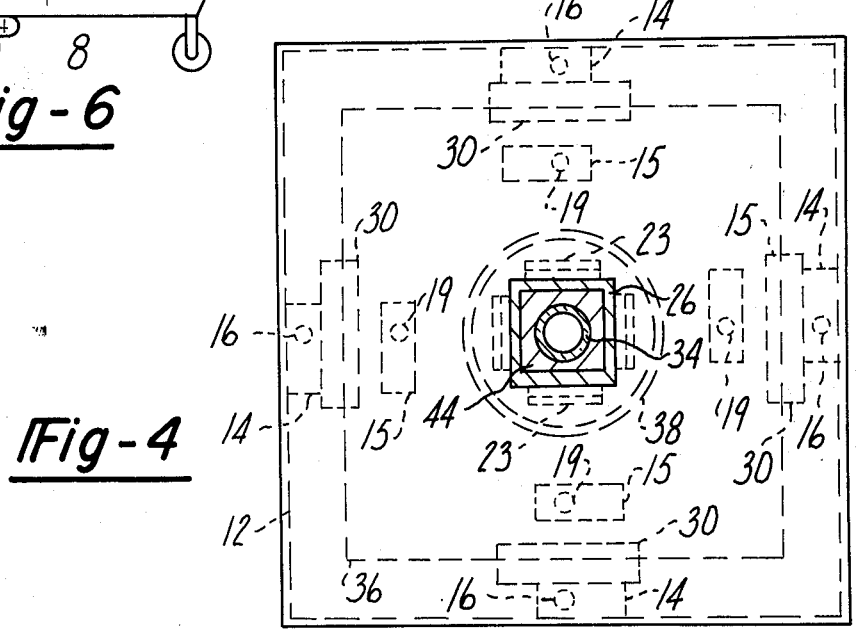
FIG. 4 is a view taken on line 4—4 in FIG. 1.

FIG. 1 and 4 illustrate a controller 10 embodying this invention. The controller includes a flat rectangular base structure 12 affixed to the trailer or other vehicle so that the base structure assumes a horizontal condition when the vehicle has a level attitude. Structure 12 carries four "vehicle-raise" switches 14, only two of which are shown in FIG. 1. The orientation of the four switches is shown by FIG. 4. Each switch is of the snap-action type, wherein pressure on its actuator plunger 16 stresses an internal spring means to make or break an electrical circuit.

The four vehicle-raise switches 14 are actuated or tripped by means of an overlying actuator plate 17 that is biased upwardly away from structure 12 by a compression coil spring 18. The spring force is contained by interengaged stop elements 20 (carried by plate 16) and stop elements 22 (carried by structure 12). Plate 17 can be moved downwardly from its FIG. 1 position by manual means 24 which comprises an upstanding tube 26 affixed to plate 17 and four rods 28 projecting laterally from tube 26; only two of the rods are visible in FIG. 1.

When a "straight downward" manual force is applied to manual means 24 (e.g. when two of the rods 28 are grasped in handle-bar fashion) plate 17 is moved downward until its lower face strikes the four upstanding stop blocks 30; the movement is sufficient to actuate each of the four vehicle-raise switches 14, but none of the four vehicle-lower switches 15, hereinafter described. Straight downward movement of plate 17 is employed to produce movements of all four jacks (outriggers) from their "stored" positions to their ground-engaged positions; during such movements that jack motors are non-loaded or only lightly loaded, so that all four jack motors can be energized without overloading the electrical system.

TILT-CORRECTION

At times it is necessary to selectively actuate switches 14. FIG. 2 illustrates such an operation applied to the right switch 14 for correcting a "tilt-down" condition of the vehicle to the left. Such a tilt-down condition is represented in FIG. 2 as a leftward declination of base structure 12. In FIG. 2, a manual downward force on the right rod 28 produces a rightward tilt-down of the rightmost edge area of plate 17, which actuates the right switch 14, but no other switch. In similar fashion, a downward force on one of the other rods 28 would actuate the corresponding switch (to the exclusion of the other three raise-vehicle switches).

The controller mechanism is equipped with a pendulum indicator 32 that is visible through a transparent tube 34, to be hereinafter described. A non-level attitude of the vehicle causes the pendulum (heavy ball) to lean or strike against the side of tube 34. The control system is designed so that the human operator can correct or minimize such tilt by depressing the rode 28 that is "opposite" the point on tube 34 contacted by ball 32.

The human operator keeps the selected rod 28 depressed until ball 32 moves away from the tube 34 wall. Under some circumstances ball 32 would roll around the tube 34 wall to a new position; it would then be necessary to release the selected rod 28 and depress the rod 28 opposite the newly positioned ball 32. When pendulum ball 32 no longer contacts the tube 34 wall, as in FIG. 1, the vehicle is in a reasonably level attitude. For most purposes some deviation from true level is permitted. The deviation "calibration" is a function of the diameter of tube 34 in relation to the diameter of pendulum ball 32.

VEHICLE-LOWERING ACTION

The four outriggers are actuated in the "vehicle-lower" direction by means of four snap-action switches 15 carried near the perimeter areas of a rockable platform 36. A compression coil spring 38 biases platform 36 downwardly away from the overlying actuator plate 17. The aforementioned tube 34 extends upwardly from platform 36 through tube 26. A manually-actuable knob 38 is carried by tube 34 for manual actuation of platform 36, either "straight up" or "rockably." The previously-mentioned pendulum 32 may be suspended from knob 38 by means of a string or cord 40. Tube 34 functions as a sight glass and also as a post structure for transmitting manual forces from knob 38 to platform 36.

At times it may be desirable or necessary to quickly move the vehicle (trailer) from one site to a different site. In that case all four jacks or outriggers 11 may be moved in the "vehicle-lower" direction at once. The vehicle mass assists such movement so that all jacks can be energized together without overloading the electrical system. To simultaneously actuate all four "vehicle-lower" switches 15 the knob 38 is pulled straight up so that the actuating plungers 19 for all four switches 15 plate 17. Such movement has no actuating effect on the other four switches 14.

At certain times during the "vehicle-raise" cycle it may be desirable to actuate selected ones of the "vehicle-lower" switches 15 to quickly achieve a level attitude. FIG. 3 illustrates one method of selectively actuating the left "vehicle-lower" switch 15. The method involves manual movement of knob 38 to the right so that platform 36 rocks about its right edge 36R. The rocking movement causes the plunger 19 of the left switch 15 to engage plate 17 and thereby energize the associated switch system. The associated block 30 may be undercut to limit the rocking movement. Knob 38 may be selectively pushed or pulled in any one of four directions to selectively rock platform 36 in the direction dictated by the condition of pendulum indicator 32. In the above-described operational mode the left switch 15 would be used to energize the right jack structure in the vehicle-lower directions.

CONTROL MOTION FREEDOM AND RESTRAINT

It is necessary that post 34 and tube 26 be free to move independently of one another, both vertically and tiltably. Therefore the diameter of post 34 is measurably smaller than the diameter of tube 26 to provide the necessary operational freedom of movement. Nevertheless, it is also desirable that each of the two movable structures be constrained to rock or tilt in only four directions. If the potential movement directions be visualized as a "clock" radiating from the central vertical axis of the controller, then the two movable structures should be restrained to move only in the 12 o'clock, 3 o'clock, 6 o'clock and 9 o'clock directions. Various "restraint" structures may be used to guide the movable structures in the desired movement directions. In the illustrated construction platform 36 is guided by the blocks 30 that engage the side edges of the platform. Actuator plate 17 is directionally guided or restrained by means of an annular member 44 affixed to tube 34. The outer surface of member 44 is square as seen in FIG. 4 and arcuate as seen in FIG. 1. Tube 26 has a square cross section (FIG. 4) measurably larger than the square cross section of member 44 to permit rocking movement of tube 34 without transmitting the motion to tube 26; member 44 functions as a guide to roughly confine tube 26 to four movement directions (as opposed to an endless variety of movement direction possibilities). Tube 26 and plate 17 may be further guided by making the support walls 21 and 23 for shoulder structures 20 and 22 as straight rectangular elements (FIG. 4).

The control mechanism shown in FIGS. 1 through 4 uses a jack-switch orientation similar to that sketched out in FIG. 5. In such an orientation each switch (14 or 15) is located midway along a side edge of the actuator plate 17. If the control mechanism were to use the jack-switch orientation sketched out in FIG. 6 the switches would be located beneath the corners of actuator plate 17.

It will be appreciated that some variation in structure and operational modes may be practiced within the scope of the attached claims.

I claim:

1. In a wheeled vehicle having jacks at or near its four corners for temporarily raising and supporting the vehicle in a substantially level attitude irrespective of the slope of the terrain, an improved control mechanism for selectively energizing the jacks: said control mechanism including a vehicle-affixed base structure carrying four perimetrically-spaced switches which individually energize respective ones of the jacks to produce vertical motion of the vehicle in one direction; a rockable platform positioned on the base structure and carrying four other perimetrically-spaced switches which individually energize respective ones of the jacks to produce vertical motion of the vehicle in the other direction; a tiltable switch actuator plate overlying the platform and base structure; first manual means connected to the actuator plate for tilting said plate downwardly around selected ones of its edges to thereby selectively actuate different ones of the first mentioned switches; means restricting the actuator plate to tilting movements in any of four distinct separate directions that will provide only four possible switch actuations when a tilt force is applied to the first manual means; second manual means connected to the platform for rocking said platform upwardly around selected ones of its edges to thereby cause the overlying plate to actuate the one of the second mentioned switches that is in an elevated condition; and means restricting the platform to rocking movements in any of four distinct separate directions that will provide only four possible switch actuations when a rocking force is applied to the second manual means.

2. The improved control mechanism of claim 1: said first manual means comprising an upstanding tube affixed to the actuator plate at a central point thereon; said second manual means comprising a post affixed to the platform at a central point thereon, said post extending upwardly through said tube so that the tube and post can be independently operated; said post having an indicator thereon for denoting deviations of the post from a true vertical condition.

3. The improved control mechanism of claim 2: said post having a hollow transparent section, said indicator comprising a pendulum element hanging within the transparent section of the post for viewing by the human operator of the control mechanism.

4. The improved control mechanism of claim 1: said mechanism further comprising first spring means biasing the actuator plate upwardly away from the base structure; and second spring means biasing the platform downwardly away from the actuator plate; the various switches being oriented to the actuator plate so that straight downward pressure on the first manual means causes the actuator plate to actuate all of the first mentioned switches but none of the second mentioned switches.

5. The improved control mechanism of claim 1: said platform having sufficient freedom of motion that a straight upward pull of the second manual means causes the actuator plate to actuate all of the second mentioned switches but none of the first mentioned switches.

* * * * *

UNITED STATES PATENT OFFICE
CERTIFICATE OF CORRECTION

Patent No. 4,040,647            Dated August 9, 1977

Inventor(s) Erwin F'Geppert

It is certified that error appears in the above-identified patent and that said Letters Patent are hereby corrected as shown below:

Column 1, line 5, the following paragraph should be added:

-- The invention described herein may be manufactured, used, and licensed by or for the Government for Governmental purposes without the payment to me of any royalties thereon.--.

Column 3, line 14, "rode" should read -- rod --.

Column 4, line 2, "directions" should read -- direction --.

Column 6, line 15, "claim 1" should read -- claim 4 --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks